455-296 SR
FIP8106 XR 3,588,374
[redacted]
CROSS REFERENCE

[11] 3,588,374

[72] Inventor Gerrit Hendrik Van Hensbergen
Hilversum, Netherlands
[21] Appl. No. 810,986
[22] Filed Mar. 27, 1969
[45] Patented June 28, 1971
[73] Assignee U.S. Philips Corporation
New York, N.Y.
[32] Priority Apr. 10, 1968
[33] Netherlands
[31] 6805157

[54] RECEIVER FOR SIGNALLING SIGNALS OF A FREQUENCY LYING IN THE SPEECH-FREQUENCY BAND

6 Claims, 1 Drawing Fig.

[52] U.S. Cl. 179/84VF, 325/473, 340/171R
[51] Int. Cl. H04m 1/50
[50] Field of Search 325/64, 65, 348, 467, 468, 473; 179/84 (VF); 340/171; 328/162

[56] References Cited
UNITED STATES PATENTS

| | | | |
|---|---|---|---|
| 2,710,347 | 6/1955 | Brady | 325/473 |
| 3,229,041 | 1/1966 | Drake et al. | 179/84 |
| 3,501,703 | 3/1970 | Baade | 179/84 |

*Primary Examiner*—Robert L. Griffin
*Assistant Examiner*—Peter M. Pecori
*Attorney*—Frank R. Trifari

ABSTRACT: A device which responds to a tone control signal has a circuit which reduces the sensitivity of the circuit to the tone signal if an interfering signal such as speech occurs. In addition, the sensitivity is also reduced if the speech signal contains a tone burst signal.

3588374
OR IN 179/84VF

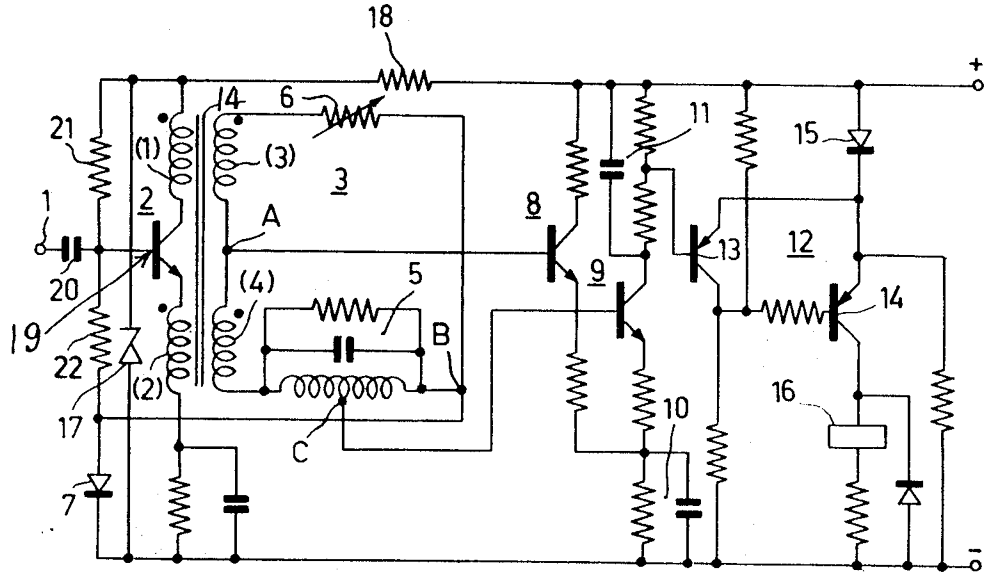
INVENTOR.
GERRIT H. VAN HENSBERGEN
BY
AGENT

RECEIVER FOR SIGNALLING SIGNALS OF A FREQUENCY LYING IN THE SPEECH-FREQUENCY BAND

The invention relates to a receiver for signalling signals of a signalling frequency lying in the speech-frequency band, in which the incoming signals are applied to a frequency-selective separation stage which separate the incoming signals into first signals of frequencies lying in a narrow frequency band around the signalling frequency and into second signals of frequencies lying outside said narrow frequency band and in which a signalling relay stage is controlled by the first and second signals, said second signals serving to prevent response of the signalling relay stage at the reception of signals having, in addition, other frequencies than the signalling frequency.

Such a signalling receiver is known from French Pat. No. Spec. 1,042,770. In this receiver some degree of speech immunity is obtained, but this speech immunity is not operative with pure tones of the signalling frequency which may occur intentionally or not intentionally in speech. The invention has for its object to improve the speech immunity of the signalling receiver of the kind set forth so that this receiver is also guarded against more or less pure tones of the signalling frequency occurring intentionally or unintentionally in speech.

The signalling receiver according to the invention is characterized in that between the input of the signalling receiver and the frequency-selective separation stage a clipping circuit is connected whose clipping level lies above the nominal level of the signalling signals and below the nominal level of the speech signals for producing distortion product signals serving to prevent response of the signalling receiver at the reception of signals having the signalling frequency and with a level that exceeds the clipping level.

The invention and its advantages will be described more fully with reference to one embodiment shown in the FIG.

Signals received at the input terminal 1 of the signalling receiver comprise speech signals in the speech-frequency band from 300 to 3400 c/s and signalling signals of a frequency of, for example, 2600 c/s. The nominal level of the signalling signals is 20 db. below the nominal level of the speech signals. The nominal level of the speech signals will hereinafter be considered to form a reference level. The nominal level of the signalling signals is then − 20 db. with respect to the reference level. The signals received at the input terminal 1 are amplified in an input amplifying stage 2 and then applied to a bridge circuit 3. The bridge circuit comprises a transformer 4, a resonant circuit 5 and a variable resistor 6. The resonant circuit 5 is tuned to the signalling frequency of 2600 c/s, and the resistor 6 is adjusted so that the bridge circuit is in a state of equilibrium for the signalling frequency. When a signal of 2600 c/s is applied to the bridge circuit, this signal will not produce a signal between the points A and B lying in a diagonal of the bridge circuit. The point B is connected via a diode 7 to the negative supply conductor (−). A given direct current flows in the pass direction of the diode 7 so that the direct voltage of the point B exceeds the voltage of the negative supply conductor (−) by an amount equal to the knee voltage of the diode 7. This knee voltage serves as a bias voltage for the transistor stages connected to the bridge circuit. The diode 7 connects the bridge point B also for alternating current to the negative supply conductor (−).

The bridge circuit 3 is not in a state of equilibrium for other frequencies than the signalling frequency so that at the reception of interference signals or speech signals, signals will be produced between the bridge points A and B. The latter signals are applied to a monitoring amplifying stage 8. Signals whose frequencies are lying in a narrow frequency band around the signalling frequency are derived from the tapping C of the resonant circuit 5 and applied to a signalling amplifying stage 9. The amplifying stages 8 and 9 are biassed so that only the positive half of the signals is amplified whereby a rectifying effect is obtained. Owing to the common emitter impedance 10 the rectified signal voltage of one amplifying stage operates as a bias voltage for the other amplifying stage. A tapping of the collector impedance 11 of the signalling amplifying stage 9 is connected to the input of a voltage level switch 12 of a conventional type comprising two cascade connected transistors 13 and 14 having a common emitter resistor formed by a diode 15. In the absence of a signalling signal the transistor 13 is nonconducting and the transistor 14 is conducting. The collector circuit of the transistor 14 includes the winding of a signalling relay 16, which is energized when the transistor 14 passes current. If at the reception of a signalling signal the collector current of the signalling amplifying stage 9 exceeds a given value, the transistor 13 is rendered conducting, whereas the transistor 14 is cut off so that the signalling relay is deenergized.

Interference signals received by the monitoring amplifying stage 8 produce across the impedance 10 a rectified voltage which brings about a decrease in the collector current of the signalling amplifying stage 9. This decrease in collector current results in that the sensitivity of the signalling receiver for the signalling signals decreases. In practice it is found that in this way it can be ensured that the signalling receiver does not respond to the signalling signals in a wide range of the signalling level from, for example, −23 db., to −10db., when the level of the interference signals lies less than about 10 db. below the level of the signalling signals. This provides an immunity against speech in which the signalling frequency may occur. In speech the signalling frequency is always accompanied by other speech frequencies, which prevent the signalling receiver from responding to the speech component with the signalling frequency.

A complete speech immunity is not obtained with the signalling receiver so far described. In speech pure tones of signalling frequency may occur intentionally or unintentionally, which might result in a response of the signalling receiver. In order to ensure an additional speech guarding the input amplifying stage 2 is constructed in the form of a symmetrical amplitude clipper having a clipping level of about −18 db. with respect to the reference level. The supply voltage for the input amplifying stage 2 is derived from a Zener diode 17, which is connected in series with a resistor 18 between the positive supply conductor (+) and the negative supply conductor (−). This Zener diode is controlled in the reverse breakdown condition by the voltage between the supply conductors and provides a relatively low and constant direct supply voltage to the input amplifying stage 2 equal to the Zener voltage. The input amplifying stage includes a transistor 19. The base of the transistor 19 is connected to the input terminal 1 through a separation capacitor 20 and the junction of two resistors 21 and 22, which are connected in series with each other and with the diode 7 between the supply conductors. These resistors provide a given bias current for the base of the transistor 19. The collector and emitter circuits of the transistor 19 include the primary windings (1) and (2) respectively of the transformer 14, the secondary windings (3) and (4) of which form parts of the bridge circuit 3. Incoming signals produce positive and negative excursions with respect to the bias current, in the base current of transistor 19. The positive current excursions drive transistor 19 in a state of high conduction and produce positive voltages across the windings (1) and (2). The peaks of these positive voltages are clipped, when transistor 19 reaches the condition of saturation. The negative current excursions drive transistor 19 in a state of low conduction and produce negative voltages across the windings (1) and (2). The peaks of these negative voltages are clipped, when the transistor 19 reaches the cutoff condition. The base bias current is preferably chosen so that an applied alternating current is symmetrically clipped whereby the portion of the harmonic components in the clipped alternating current is at a maximum. By appropriate choice of the Zener voltage of the Zener diode 17 the signal level at which the input amplifying stage 2 starts clipping the incoming signals, the so-called clipping level, can be determined beforehand. In practice the clipping level will be adjusted slightly above the nominal signalling level, for example, at −18 db., in order not to reduce the sensitivity of the signalling receiver for signalling signals of the nominal level. When a signalling signal of a lever of −18 db. or higher is received, the input amplifying stage 2 will produce harmonic components. The bridge circuit 3 is not in equilibrium for these harmonic components so that the latter are applied to the monitoring amplifier 8 and have the same effect as interference signals, which means that the sensitivity of the signalling receiver for the signalling signal decreases. In practice it can in this way be ensured that with a signalling signal of a level higher than −10 db., the level of the harmonics is so high that the monitoring amplifying stage 8 renders the signalling receiver insensitive to the signalling signal. When the speech contains a pure tone of the signalling frequency, with a level that may be 10 db. lower than the nominal level of the speech signals, the signalling receiver will not respond. In this way a considerable improvement in the speech immunity and hence in the reliability of the signalling receiver is obtained.

I claim:

1. A circuit for receiving a wide bandwidth signal and a substantially single frequency signal having a frequency within said wide bandwidth and an amplitude less than the amplitude of said wide bandwidth signal, said circuit comprising clipping means for producing distortion signals upon the occurrence of tone signals of said single frequency within said wide bandwidth signal coupled to receive all of said signals and having a clipping level between the amplitude values of said wide bandwidth and single frequency signals; a frequency selection circuit having an input coupled to the output of said clipping means, a first output means coupled to the output of said frequency selective circuit for transmitting signals having a frequency substantially equal to that of said single frequency signal, and a second output means coupled to the output of said clipping means for transmitting signals having frequencies within said wide bandwidth and away from the frequency of said single frequency signal; first amplifier means coupled to said first output means; and means for reducing the sensitivity of said first amplifier means to said single frequency signal in accordance with the amplitudes of both said wide bandwidth and distortion signals, said means for reducing comprising a second amplifier means having an input coupled to said second output means, and an output coupled to said first amplifier means.

2. A circuit as claimed in claim 1 wherein said clipping means comprises a transformer having two primary windings, a transistor having emitter and collector electrodes coupled to one end of each of said primary windings respectively, and a Zener diode having two terminals coupled to the remaining ends of said primary windings respectively.

3. A circuit as claimed in claim 1 wherein said frequency selection circuit comprises a bridge circuit having four legs, said first and second legs comprising a transformer having two series coupled secondary windings, said third leg comprising a variable resistor coupled to one of said secondary windings, and said fourth leg comprising a tuned circuit coupled to said resistor and the remaining winding.

4. A circuit as claimed in claim 3 wherein said second output means comprises the junction of said secondary windings, and said first output means comprises a tap on said tuned circuit.

5. A circuit as claimed in claim 1 wherein each of said first and second amplifier means comprises transistors having coupled emitters.

6. A circuit as claimed in claim 1 further comprising a bistable circuit coupled to said first amplifier means, and a relay controlled by said bistable circuit.